(12) United States Patent
Masuda et al.

(10) Patent No.: US 7,604,279 B2
(45) Date of Patent: Oct. 20, 2009

(54) WINDSCREEN APPARATUS FOR MOTORCYCLE

(76) Inventors: Nobukatsu Masuda, c/o Kabushiki Kaisha Imasen Denki Seisakusho, 1-banchi, Aza-Kakihata, Inuyama-shi 484-8507 (JP); Akinori Mori, c/o Kabushiki Kaisha Imasen Denki Seisakusho, 1-banchi, Aza-Kakihata, Inuyama-shi 484-8507 (JP)

( * ) Notice: Subject to any disclaimer, the term of this patent is extended or adjusted under 35 U.S.C. 154(b) by 71 days.

(21) Appl. No.: 11/930,133

(22) Filed: Oct. 31, 2007

(65) Prior Publication Data
US 2008/0111392 A1    May 15, 2008

(30) Foreign Application Priority Data
Nov. 6, 2006    (JP) ............................ 2006-299941

(51) Int. Cl.
*B60R 7/00*    (2006.01)

(52) U.S. Cl. ..................................... 296/78.1; 296/77.1
(58) Field of Classification Search ............... 296/77.1, 296/78.1, 84.1
See application file for complete search history.

(56) References Cited

U.S. PATENT DOCUMENTS

2003/0062740 A1 *    4/2003    Takemura et al. .......... 296/78.1

* cited by examiner

*Primary Examiner*—Joseph D Pape

(57) ABSTRACT

A windscreen apparatus can change the height of a screen in front of a rider desirably or in accordance with the vehicle speed. The apparatus comprises a pair of slide rails of which sliding direction is oriented in a vertical direction or inclined at an angle; a pair of carrier plates for supporting the screen slidably along the slide rails; a pull-up cable connected to an upper end portion of the carrier plate; a pull-down cable connected to a lower end portion of the carrier plate; and a rotary drum on which the cables are wound around, and the rotary drum winds and unwinds the cables so as to slide the carrier plates within a slidable range in the slide rails.

3 Claims, 5 Drawing Sheets

WINDSCREEN APPARATUS FOR MOTORCYCLE

BACKGROUND OF THE INVENTION

The invention relates generally to movable windscreen apparatus mounted on motorcycles for moving a windscreen up or down in accordance with voluntary operation of a rider or vehicle speed, and in particular to a windscreen apparatus for motorcycles, in which even when trouble occurs in a drive mechanism of the apparatus during motorcycle riding, it does not cause an awful sensation to the rider.

When riding a vehicle such as a motorcycle which has no cabin, the rider is continuously subjected to wind pressure (air resistance) from the traveling direction. A proportional relationship exists between the vehicle speed and the wind pressure from the traveling direction. As the vehicle speed is increased, the body of the rider receives a stronger force in a backward direction from the wind pressure. In order to maintain his or her riding posture, the rider is continuously required to exert a large force to hold the handlebar. After a long distance riding at a high speed, he or she feels a strong exhaustion. Further, the wind that the rider receives during riding affects the body temperature of the rider, and thus his or her exhaustion is increased. In order to reduce the exhaustion of the rider due to such wind, many middle or large sized motorcycles suitable for long-distance traveling, which are generally called "tourers," are equipped with a windscreen as a standard accessory.

The windscreen effectively prevents the rider from being subjected to direct wind from the front. However, when a vehicle equipped with too large a windscreen runs at a high speed, a problem arises in that the vehicle body suffers a large air resistance resulting in a decrease in fuel efficiency. Moreover, as the vehicle speed increases, the rider tends to lower his or her riding posture by forwardly inclining his or her upper body on the motorcycle. However the rider makes his or her riding posture lower by forwardly inclining his or her upper body, if the windscreen is maintained without changing its original height, the windscreen still receives a large wind resulting in a decrease of the fuel efficiency of the vehicle. Furthermore, body shapes of riders of motorcycles are widely different from each other. Therefore, the height of the windscreen is desired to be adjustable in accordance with the size of the rider.

Conventionally, a movable windscreen apparatus disclosed in patent document 1 (Japanese Laid-Open Patent Publication Serial No. 2000-159172) is known as a solution to the above problems. The movable windscreen apparatus disclosed in patent document 1 includes a guide rail, a carrier plate that is slidably disposed on the guide rail, and a windscreen mounted at a lower end of the carrier plate. The movable windscreen apparatus is arranged so that the windscreen is connected to the vehicle body via links at the lower ends thereof so as to drive and slide the carrier plate by means of a driving force of a motor transmitted via cables.

In such structure, when the motor is activated as the drive source, the cables are wound up to raise the carrier plate. The carrier plate pushes up the inclined windscreen from the bottom end thereof. Since the windscreen is supported at right and left ends thereof by the links, one end of which is connected to the vehicle body, the windscreen is held in its raised position. That is, the movable windscreen apparatus disclosed in patent document 1 is an excellent technology in the following point. That is, not only is the windscreen slidable, but also, while being stored, the windscreen can be inclined to thereby reduce the wind pressure that the windscreen receives.

However, the movable windscreen apparatus disclosed in patent document 1 has a structure in which the cables transmit the driving force of the motor to the carrier plate. Therefore, one of the cables is naturally connected to an upper area of the carrier plate, and another cable is connected to the lower area thereof. By pulling or releasing the cables under tension, the carrier plate is raised and lowered. In such structure, even when the cable connected to the upper area of the carrier plate is accidentally broken during running, the carrier plate is simply lowered and the windscreen is inclined. Therefore, it seems that the structure has no particular problem.

However, when the cable connected to the lower area of the carrier plate is accidentally broken during running, the strained upper cable causes the carrier plate to rise abruptly; and accordingly the windscreen, which is under the wind pressure from its running direction, pops up toward the face of the rider. Even if the windscreen does not hit directly on the rider's face, there is a possibility that the rider is astonished and loses his or her balance leading to a miss-operation of the handlebar. In the case of riders of motorcycles, a small miss-operation of the handlebar may cause the vehicle to fall, with the fall of the vehicle leading directly to an injury to the rider. Particularly in the case of a rider who has already run a long distance on a motorcycle, his or her concentration power is reduced due to fatigue. Therefore, it is strongly required that, even when a mechanical failure occurs on an accessory or instrument, it should not cause the rider to be frightened nor give him or her an awful sensation.

Further, in the movable windscreen apparatus disclosed in patent document 1, due to its movable structure, the windscreen has to be connected with the carrier plate and the links at a point respectively. Therefore, it is doubtful in the assembly strength of the apparatus. Especially, not only that the windscreen of the motorcycle receives an extremely large wind pressure during its running at a high speed but also, under such situation, a bird or the like may actually hit thereon. Therefore, not only during running at a high speed but also even when something strikes the windscreen, there must not happen such a case that the windscreen falls off during running.

Furthermore, in the movable windscreen apparatus disclosed in patent document 1, due to its structure one end of the link has to be connected to the vehicle body. Therefore, when mounting the windscreen apparatus in accordance with patent document 1 to a vehicle body, a base for connecting the link has to be provided on the vehicle body also. Therefore, it is difficult to assemble the movable windscreen apparatus disclosed in patent document 1 to the vehicle body afterward. Therefore, the apparatus has to be exclusively designed for each model of the vehicle. That is, the movable windscreen apparatus disclosed in patent document 1 has a problem that the product is not easily generalized.

SUMMARY OF THE INVENTION

The invention has been proposed in view of the above-mentioned problems. An object of the invention is to provide a windscreen apparatus for motorcycles at a reasonable cost that, even when a mechanical trouble occurs, will not cause a rider to feel an awful sensation, that has a satisfactory assembly strength, and that is applicable as a general purpose product.

In order to solve the above problems, in some embodiments of the invention, a movable windscreen apparatus for motorcycles capable of changing the height of a screen disposed in front of a rider desirably or in accordance with the vehicle speed includes a pair of right and left slide rails disposed in an upper area or front area of a steering unit on a vehicle body, a sliding direction extending therealong being oriented in a vertical direction or inclined at an angle with respect to a front-rear direction of the vehicle, a pair of carrier plates each disposed in the right and left slide rails respectively, the pair of carrier plates supporting the screen at right and left ends thereof in a slidable manner along the slide rails therebetween, a pull-up cable connected to an upper end portion of each of the carrier plates in the sliding direction therealong, a pull-down cable connected to a lower end portion of each of the carrier plates in the sliding direction therealong, the pull-down cable having a mechanical strength larger than that of the pull-up cable, and a rotary drum on which each of said pull-up and pull-down cables is wound around, the rotary drum being driven to rotate under power to thereby wind and unwind the pull-up and pull-down cables so as to slide the pair of carrier plates within a slidable range in each of the pair of right and left slide rails.

In some embodiments the invention provides a movable windscreen apparatus for motorcycles as described above, wherein a pull-up cable is connected to a first carrier plate, located in one slide rail of the pair of right and left slide rails, at an upper end portion thereof in the sliding direction, a pull-down cable is connected to a second carrier plate, located in the other slide rail, at a lower end portion thereof in the sliding direction, a link cable links between the first carrier plate being connected to a lower end portion thereof in the sliding direction and the second carrier plate being connected to an upper end portion thereof in the sliding direction, the pull-up and pull-down cables, linked each other via the link cable and connected to the respective carrier plates, are laid around on each of the pulleys, disposed at the upper end and the lower end of the respective slide rails, and pulled and fed out via the pulleys at the respective ends of the slide rails.

Some embodiments of the invention provide movable windscreen apparatus for motorcycles as described above, in which each of the cables is connected to each of the holders disposed in upper and lower portions of each of the carrier plates in the sliding direction, an opening of each of the holders for allowing the cable to go therethrough is widely formed so as to ensure a wide rotation range for each cable, each of the slide rails is formed in a curved configuration, and the inclination angle of the screen is changed as the screen moves in a vertical direction along the respective slide rails.

By adopting the above-described structures, the following effects can be obtained.

First, where the mechanical strength of the pull-down cable is adapted to be higher than that of the pull-up cable, therefore, even when an extremely large load is applied to a moving portion of the movable windscreen apparatus, or even when a cable pulling the carrier plates is worn, there is little possibility that the pull-down cable having a higher mechanical strength than that of the pull-up cable will be broken off earlier than the pull-up cable. Consequently, according to the first aspect of the invention, even when a cable as the power transmission means is broken off for some reason, the screen does not pop up abruptly toward the face of the rider causing the rider to feel astonishment or an awful sensation.

Also, where a pair of right and left slide rails holds the screen via the respective carrier plates, the screen can be assembled stably and operated smoothly in vertical directions. Further, since two slide rails are disposed right and left, the slide rails are located at positions outside the front area of the rider (positions where the field of vision of the rider is not interfered with thereby). Accordingly, since slide rails of relatively long size can be adopted, the movable range of the screen can be arranged to be greater.

The pull-up cable can be connected to the first carrier plate only in one slide rail of the pair of right and left slide rails, and the pull-down cable connected to the second carrier plate in the other slide rail. The first carrier plate and the second carrier plate are then connected to each other by an interposed link cable. Therefore, it is not necessary to provide the pull-up cable and the pull-down cable connected to each of the slide rails. Two of the first carrier plate and the second carrier plate can be controlled simultaneously by one rotary drum. That is, according to the second aspect of the invention, the movable windscreen apparatus can be reduced in its size and weight as well as its production cost. Furthermore, each of the cables is laid around on each of the pulleys each disposed at the upper and lower ends of the respective slide rails and maintained in a strained state. Accordingly, by pulling and releasing the pull-up cable and the pull-down cable, the right carrier plate and the left carrier plate can be raised and lowered synchronously.

According to the third aspect of the invention, each of the slide rails is arranged so as to curve upwardly from the bottom end toward the upper end thereof in a travel direction. The screen rises while increasing its angle with respect to the front/rear horizontal direction of the vehicle as the screen is raised along the right and left slide rails. Contrarily, the screen descends while losing its angle with respect to the front/rear horizontal direction of the vehicle as the screen is lowered along the right and left slide rails. That is, in some embodiments of the invention, the inclination angle of the screen changes as the screen is raised along the right and the left slide rails. Therefore, the air resistance can be reduced by lowering the screen, and a large effect of wind screening can be obtained by raising the screen.

In some embodiments each of the openings, which are formed in the both ends of the respective carrier plates on the respective holder in the sliding direction thereof for allowing the cable to pass therethrough, is widely formed. Therefore, the movable range for each cable is ensured widely. In addition, the pulleys are disposed at the upper and lower ends of the respective curved slide rails, and the pull-up cable is laid around the upper pulley, and the pull-down cable is laid around the lower pulley. With this arrangement, even when each of the carrier plates slides in the respective slide rails, the cable can be fed to a point adjacent to the respective pulleys. That is, according to the third aspect of the invention, even when the sliding direction of the carrier plates is displaced with respect to the direction connecting between the upper and the lower pulleys (refer to FIG. 3), the cable is prevented from working off from the pulleys. Furthermore, since the movable range of the cable is arranged widely, the load applied on the periphery of the cable can be reduced.

DETAILED DESCRIPTION OF EMBODIMENTS AS EXAMPLES

Figure 1:
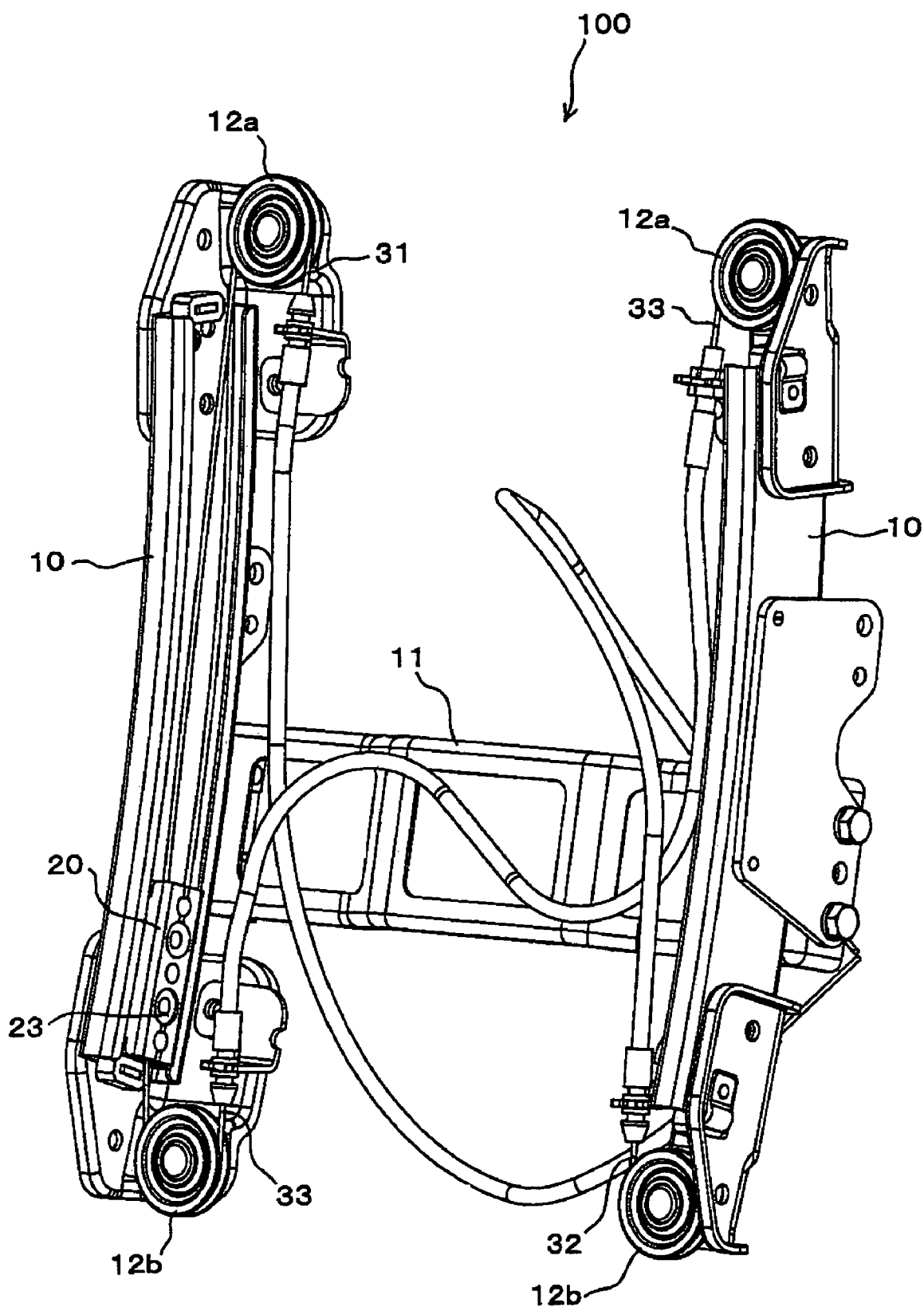
FIG. 1 is a perspective view of a movable windscreen apparatus for motorcycles in accordance with an example as viewed from front-left side thereof.

An embodiment of the invention will be described below with reference to the drawings. A movable windscreen apparatus 100 for a motorcycle is capable of changing the height of a screen 50 disposed in front of a rider in accordance with voluntary operation (or vehicle speed). The movable windscreen apparatus 100 is composed of a pair of slide rails 10, a pair of carrier plates 20, a pair of cables 31 and 32, and a rotary drum 40. Each of these component elements will be described below.

First of all, the pair of slide rails 10 is described. The pair of slide rails 10 holds the screen 50 in a slidable manner via the pair of carrier plates 20 (which will be described later) disposed in a sliding space. The pair of slide rails 10 is disposed so that the sliding direction thereof is oriented vertically (or inclined with respect to a front-rear direction) in an upper area or front area of a steering unit (including exterior components such as a cowl) in a vehicle body. The slide rail may be composed of a single rail. However, since the screen 50 in this invention is held via the respective carrier plates 20, the screen 50 can be moved vertically smoothly, and furthermore, the screen 50 is stably assembled with the right and left rails. Therefore, it is particularly preferable that the pair of slide rails is constructed of right and left-side rails. Further, when the slide rails are composed of two rails, each of the rails is disposed at right and left positions respectively. Therefore, each of the slide rails 10 is disposed at a position out of the front area of the rider (and the field of vision of the rider is not interfered with). That is, relatively long slide rails are preferably adopted so that the movable range of the screen 50 is increased. Furthermore, it is arranged so that the two slide rails 10 are integrally connected to each other and fixed with a bridge frame 11 as a unit. Since the apparatus 100 is assembled as a unit, the slide rails 10 can be mounted easily to the vehicle body.

Figure 2:
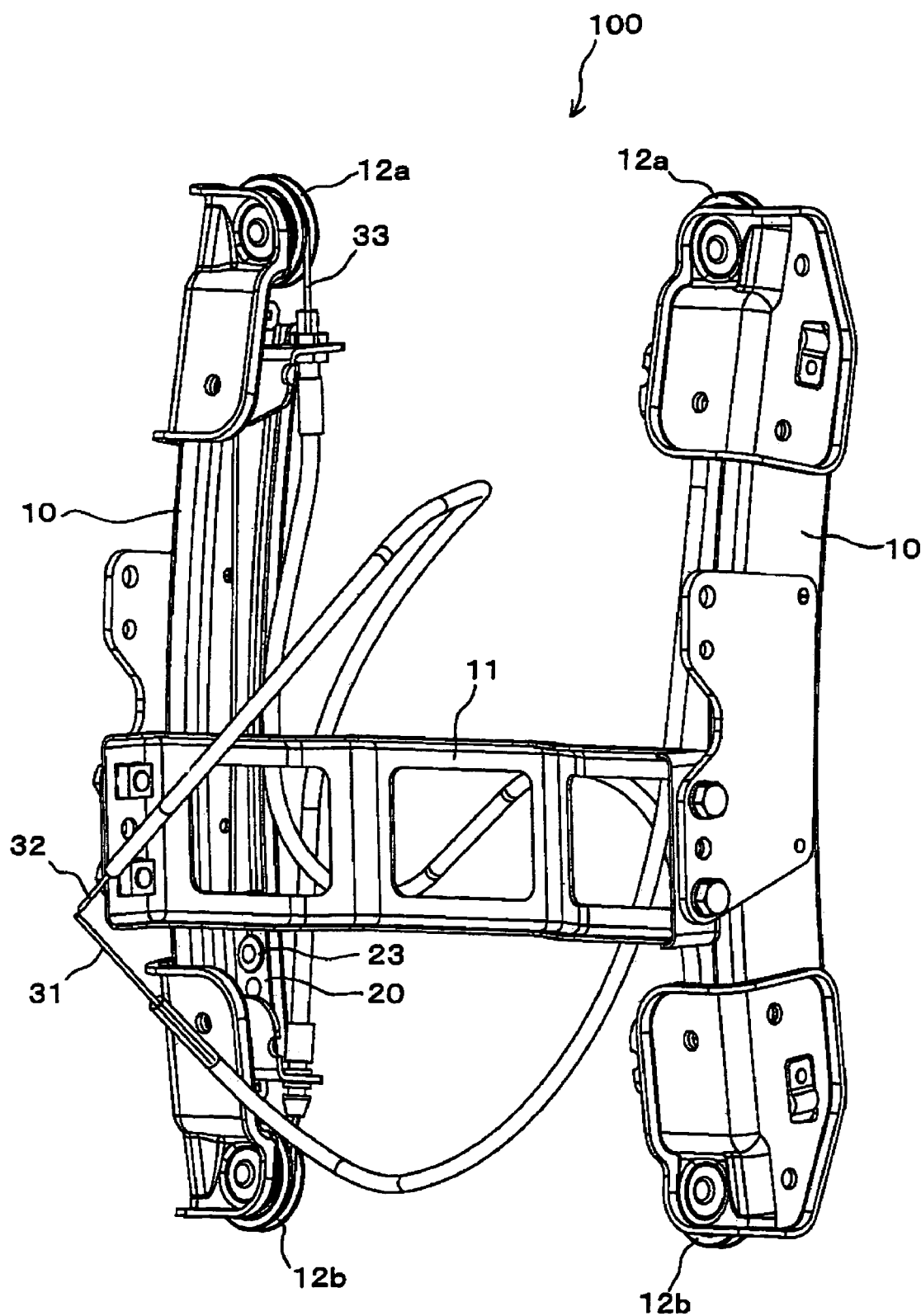
FIG. 2 is a perspective view of the movable windscreen apparatus for motorcycles as viewed from the rear-right side thereof.

If the screen 50 can be held in a slidable manner via the carrier plates 20 each disposed in a sliding space as described above, the constitution of the slide rails 10 is not particularly restricted. However, each of the slide rails 10 is preferably constituted of a long metal member having a generally U-like shape in its cross section and having opening at one side thereof as shown in FIG. 1 and FIG. 2. In such constitution, the opening having a generally U-like shape in its cross section may be oriented to the forward direction (movement direction of the vehicle) so as to allow the carrier plates 20 to slide. However, in particular, two of the slide rails 10 are preferably arranged so that the respective openings face to each other. The reason for this is as described below. That is, when each of the slide rails 10 is formed in a generally U-like shape in cross-section, two side walls are formed perpendicular to the bottom wall at both sides of the bottom wall. Openings are thus formed as shown in FIG. 1 and FIG. 2 between the two side walls. One of the side walls of each of the slide rails 10 is oriented to the forward direction of the vehicle and the other of the side walls is oriented to the backward direction of the vehicle. That is, by adopting the above-described constitution and arrangement, the wind pressure from the movement direction of the vehicle is borne by the front and rear two side walls. By this arrangement, the slide rails 10 are provided with a satisfactory strength respectively.

Figure 5:
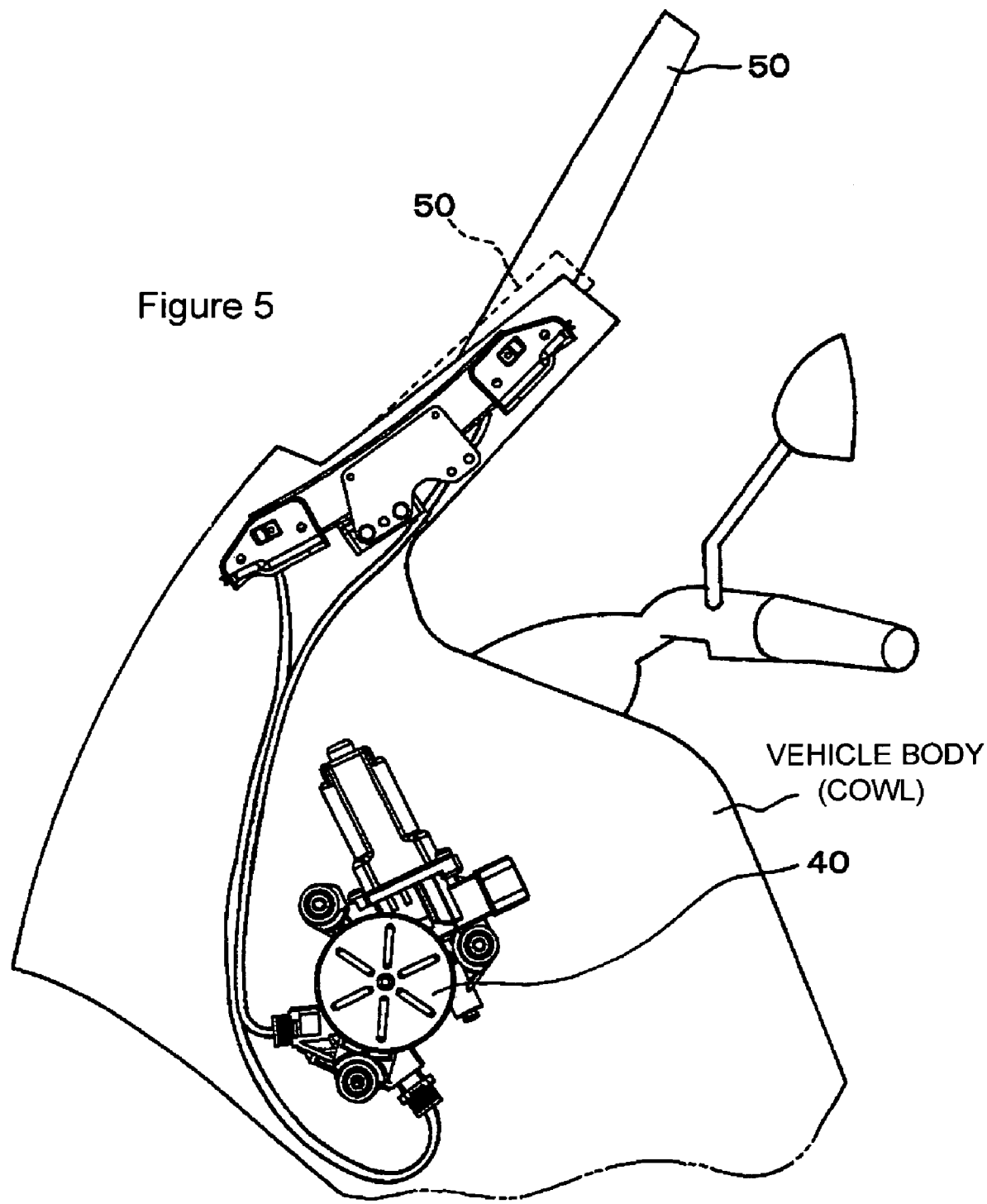
FIG. 5 schematically shows the movable windscreen apparatus for motorcycles mounted on a motorcycle as viewed from the left side thereof.

Further, the configuration of the slide rails 10 may not be a completely straight configuration, but the slide rails 10 may have a curved configuration with respect to their longitudinal direction. More particularly, each of the slide rails 10 may be formed with a generally linear configuration as viewed from the front side of the vehicle, and a curved configuration as viewed from the side of the vehicle from the lower end toward the upper end thereof as shown in FIG. 1 and FIG. 2. When such a constitution is adopted, the screen 50 rises while increasing its angle with respect to the front/rear horizontal direction of the vehicle as the screen 50 is raised along the right and left slide rails. Contrarily, the screen 50 descends while losing its angle with respect to the front/rear horizontal direction of the vehicle as the screen 50 is lowered along the right and left slide rails. That is, the inclination angle of the screen 50 changes as the screen 50 is raised or lowered along the slide rails 10 as shown in FIG. 5. Therefore, when the screen 50 is lowered, the air resistance is appropriately reduced; while when the screen 50 is raised in use, a large wind screen effect can be obtained.

Next, the carrier plates 20 will be described. The carrier plates 20 are slidably disposed in the slide rails 10 and support the screen 50. Each of the carrier plates 20 is provided with two holders 23 at two points in the sliding direction, and each of the holders 23 is connected with a cable. When the cables connected to the holders 23 are pulled and released, the carrier plates 20 are moved within a slidable range on the slide rails 10.

Figure 3:
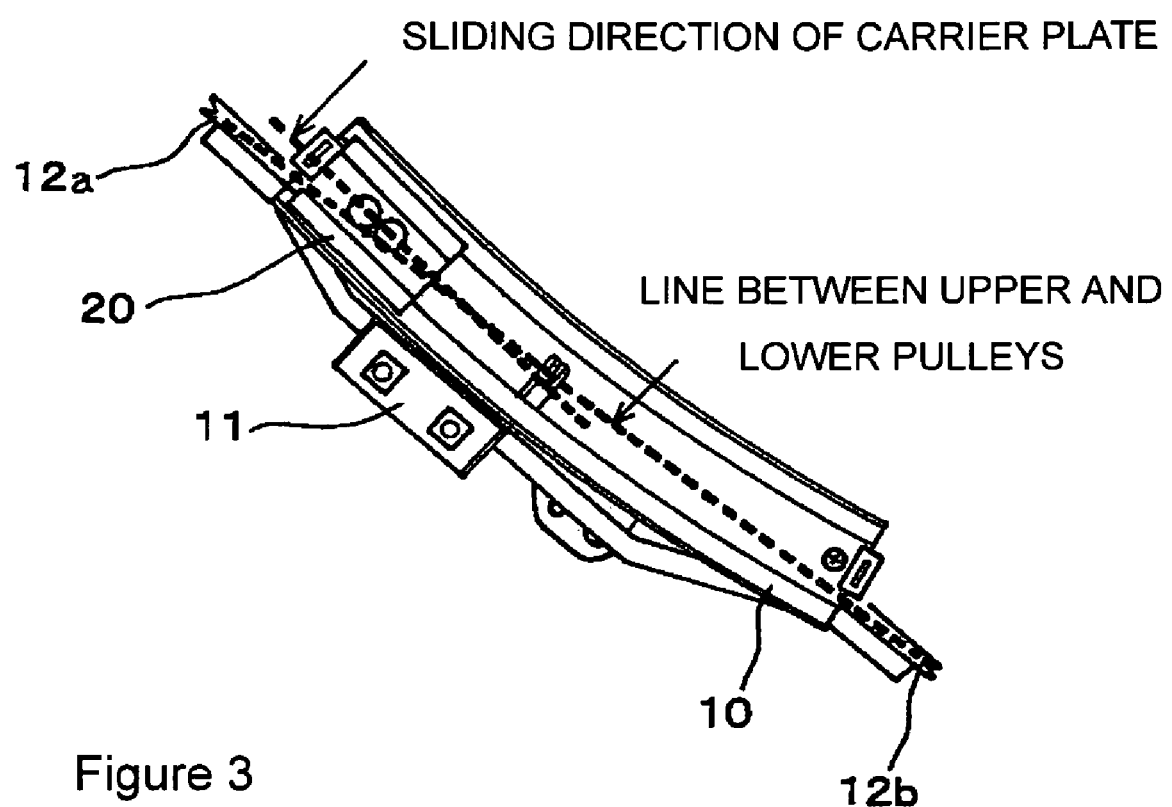
FIG. 3 schematically shows the inside of a slide rail of the movable windscreen apparatus for motorcycles.
Figure 4A:
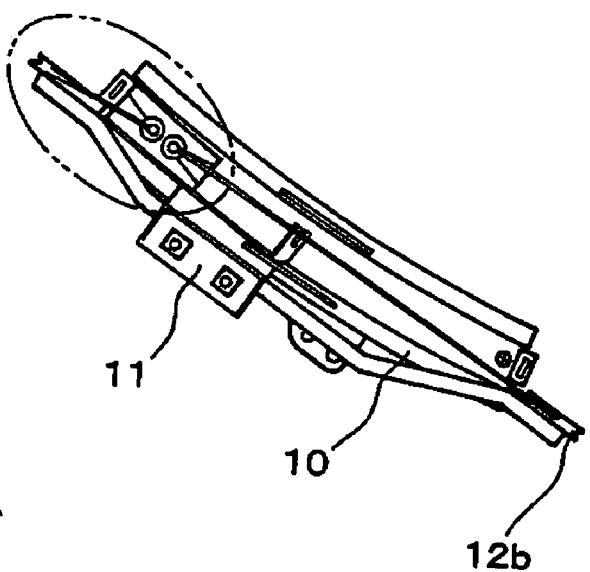
FIG. 4A shows the inside of one slide rail of the movable windscreen apparatus for motorcycles.
Figure 4B:
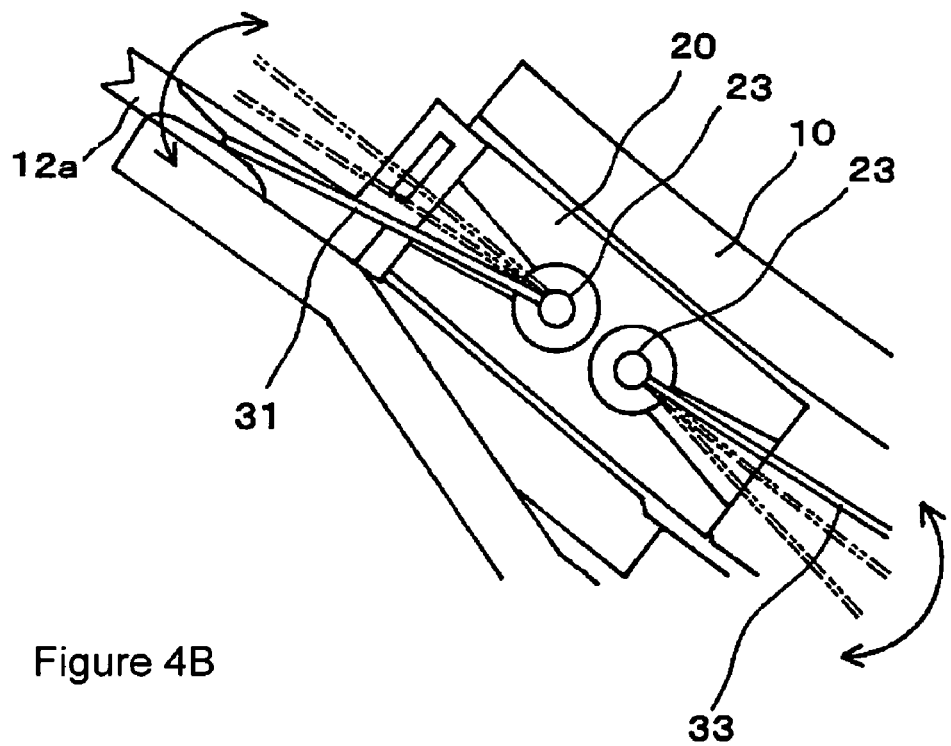
FIG. 4B is an enlarged view of a part marked with a circle in FIG. 4A.

Each of the holders 23 in the carrier plates 20 is preferably formed with a wide opening for allowing the cable to go therethrough so as to ensure the cable a wide movable range as shown in FIG. 4B. Each of the curved slide rails 10 is provided with pulleys 12a and 12b disposed at the upper and lower ends thereof. Therefore, even when each of the carrier plates 20 slides along a course which is displaced from a line connecting the upper and lower pulleys 12a and 12b (refer to FIG. 3), the above-described arrangement prevents the cable from falling off of the pulleys 12a and 12b. Further, since a wide movement range is ensured for the cable, the load applied to the side face of the cable can be effectively reduced. In the case where the wide movement range for the cable is not formed as described above, the two holders 23 are not always necessary to form in the generally central area of the carrier plates 20 as shown in FIG. 4B. The holders 23 may then be provided at the respective ends of the carrier plates 20. In the carrier plates 20, the part that slides in each of the slide rails 10 and the part that supports the screen 50 may not be formed integrally. In such case, the parts may be manufactured separately and assembled together afterward.

Next, the cables 31 and 32 will be described. Each of these cables is connected to one of the holders 23 of the carrier plates 20 at one end, with the other end of the cable being wound on the rotary drum 40 (which will be described later). When the rotary drum 40 is driven to rotate, the cable is pulled or released to thereby move the carrier plates 20 within the slidable range of the slide rails 10. That is, the sliding amount of the carrier plates 20 depends on the movement amount of the cable 30.

According to the invention, the cables include a pull-up cable 31 (a cable that is wound when the screen 50 is raised), which is connected to the holder 23 at the upper end of the carrier plate 20 in the sliding direction thereof, and a pull-down cable 32 (a cable that is wound when the screen 50 is lowered), which is connected to the holder 23 at the lower end of the carrier plate 20 in the sliding direction thereof. According to the invention, the mechanical strength of the pull-down cable 32 is intentionally made stronger than that of the pull-up cable 31. Therefore, even when a large load is applied to the moving portion of the movable windscreen apparatus, or even when a cable pulling the carrier plate 20 is worn, the pull-down cable 32 with a higher mechanical strength than that of the pull-up cable 31 is not broken prior to the pull-up cable 31. The mechanical strength of the pull-down cable 32 can be arranged to be stronger than that of the pull-up cable 31 by using a wire for the pull-down cable 32 of which the thickness (the size of the sectional diameter) is larger than that of the pull-up cable 31, or by adopting a wire of a different material for the pull-down cable 32. When the two slide rails 10 are controlled by a single rotary drum 40 (which will be described later), a link cable 33 for linking the carrier plates 20 in the slide rails 10 is provided. The mechanical strength of the link cable 33 may be the same as that of the pull-up cable 31.

Next, the rotary drum 40 will be described. The rotary drum 40 includes the pull-down cable 32 and the pull-up cable 31 wound therein. When the rotary drum 40 is driven to rotate, each of the cables is moved forward and backward to thereby slide the carrier plates 20 within the slidable range of the slide rails 10. The rotary drum 40 may be driven to rotate by a force of the rider him or herself. However, for safety during riding, the rotary drum 40 is preferably driven by an electric motor. In particular, a general purpose motor with a drum, which is used for window regulator devices for automobiles and which is easily available at a low price, is preferably adopted for the electric motor. The motor is preferably adapted to operate by voluntary operation by the rider of a switch (not shown) provided adjacent to a handle grip of the motorcycle.

The screen 50 will be described. As shown in FIG. 5, the screen 50 is disposed in front of the rider being held by the carrier plates 20 to protect the rider from the wind pressure. The screen 50 is preferably made of a material such as a transparent polycarbonate, an ABS resin or the like, which is superior in transparency and crashworthy. In the case where only the wind shielding efficiency is required and field of vision of the rider is not interfered, the screen 50 is not always required to be transparent.

A particular embodiment of the invention will be described below.

FIGS. 1 to 5 show an example of a windscreen apparatus for a motorcycle according to the embodiment of the invention. The windscreen apparatus for a motorcycle according to the embodiment includes a pair of slide rails 10, two pairs of pulleys 12a and 12b, a pair of carrier plates 20, cables 31, 32, and 33, and a rotary drum 40.

In this example, each of the pairs of slide rails 10 is composed of a curved long member having a generally U-like shape in cross-section opened at one side, and the slide rails 10 are integrally fixed to each other by a bridge frame 11 with the slide rails 10 disposed with their openings facing each other.

In these right and left slide rails 10, in the right-side slide rail a first carrier plate 20 is disposed; and in the left-side slide rail 10, a second carrier plate 20 is disposed. In each of the carrier plates 20, in an upper end area in the sliding direction of the right-side carrier plate 21, a pull-up cable 31 is connected to a holder 23. On the other hand, a pull-down cable 32 is connected to a holder 23, which is disposed in a lower end area in the sliding direction of the second carrier plate 20. The holder 23 disposed in the lower end of the right carrier plate 20 in the sliding direction and the holder 23 disposed in the upper end of the left carrier plate 20 in the sliding direction are linked with a link cable 33. That is, the pull-up cable 31, the link cable 33, and the pull-down cable 32 are linked with each other and disposed in an N-like configuration. In this cable 30, the mechanical strength of the pull-down cable 32 is adapted to be higher than that of the pull-up cable 31 and the link cable 33. The cables are laid around on the upper pulleys 12a each disposed at the upper end of the respective slide rails 10 and the lower pulleys disposed at the lower end of the slide rails 10 in a tightened state. With this arrangement, when the two cables (31 and 32) disposed in an N-like configuration are pulled up or down at both ends thereof, the right carrier plate 20 and the left carrier plate 20 are moved vertically synchronously.

One end of each of the pull-up cable 31 and the pull-down cable 32 is wound on the rotary drum 40 respectively. When the rotary drum 40 is driven to rotate in one direction, the pull-up cable 31 is wound and the pull-down cable 32 is fed out, and the screen 50 supported by the carrier plates 20 is thereby raised. When the rotary drum 40 is driven to rotate in an opposite direction, the pull-up cable 31 is fed out and the pull-down cable 32 is wound, and the screen 50 supported by the carrier plates 20 is then lowered.

Further, according to the example, each of the slide rails 10 is provided with limit switches disposed at points adjacent to the upper and lower limits of the slidable range. Therefore, when either of the carrier plates 20 comes into contact with any of the limit switches, the power supply is turned OFF, and thus, a drive motor of the rotary drum 40 is stopped from driving.

The windscreen apparatus for motorcycles in the above-described example according to the invention is arranged to be driven to operate by a voluntary operation of the rider. However, the technical spirit of the invention is not limited particularly to the above. The windscreen apparatus for motorcycles may be arranged so as to operate synchronously with the vehicle speed of the motorcycle mounted therewith. Or, the windscreen apparatus for motorcycles may be arranged to operate while detecting the wind pressure with a sensor.

In the above description, it is assumed that the windscreen apparatus according to the invention is a mounted on a motorcycle for the convenience of the description. However, the invention is not particularly limited to the above, but may be applied to a cabin-less vehicle, which is equipped with three wheels and generally called as "trike-bike", a snow mobile, or the like.

What is claimed is:

1. A movable windscreen apparatus for a motorcycle, the apparatus comprising:

a pair of right and left slide rails disposed in an area of a steering unit on a vehicle body, said slide rails being inclined at an angle with respect to a front-rear direction of the vehicle;

a pair of first and second carrier plates, the first carrier plate disposed on one of the right and left slide rails, and the second carrier plate disposed on the other of the right and left slide rails, the pair of carrier plates supporting the screen at right and left ends of the screen in a slidable manner between the slide rails;

a pull-up cable connected to an upper end portion of the first carrier plate;

a pull-down cable connected to a lower end portion of the second carrier plate, the pull-down cable having a mechanical strength larger than that of the pull-up cable; and a rotary drum around which each of said pull-up and pull-down cables is wound, the rotary drum being driven to rotate to thereby wind and unwind the pull-up and pull-down cables so as to slide the pair of carrier plates within a slidable range along each of the pair of right and left slide rails.

2. The movable windscreen apparatus for motorcycles according to claim 1, wherein:
said pull-up cable is connected to a first carrier plate, located in one slide rail of the pair of right and left slide rails, at an upper end portion thereof in the sliding direction,
said pull-down cable is connected to a second carrier plate, located in the other slide rail, at a lower end portion thereof in the sliding direction,
a link cable links between the lower end portion of the first carrier plate and the upper end portion of the second carrier plate,
pulleys are disposed at upper and lower ends of the right and left slide rails, and
said pull-up cable, said pull-down cable and said link cable are laid around the pulleys, and pulled and fed out via the pulleys at the respective ends of the slide rails.

3. The movable windscreen apparatus for motorcycles according to claim 1 or 2, wherein:
a holder is disposed at each of an upper and a lower portion of each of the first and second carrier plates,
each of said holders has an opening that allows one of said cables to go through that opening, wherein the opening is wide so as to ensure a wide rotation range for each of said cables, and,
each of the slide rails is formed in a curved configuration so that the inclination angle of the screen is changed as the screen moves along the slide rails.

* * * * *